Feb. 29, 1944.     F. NEAL     2,343,019
TRACTOR TRAILER COMBINATION
Filed Sept. 4, 1942     2 Sheets-Sheet 1
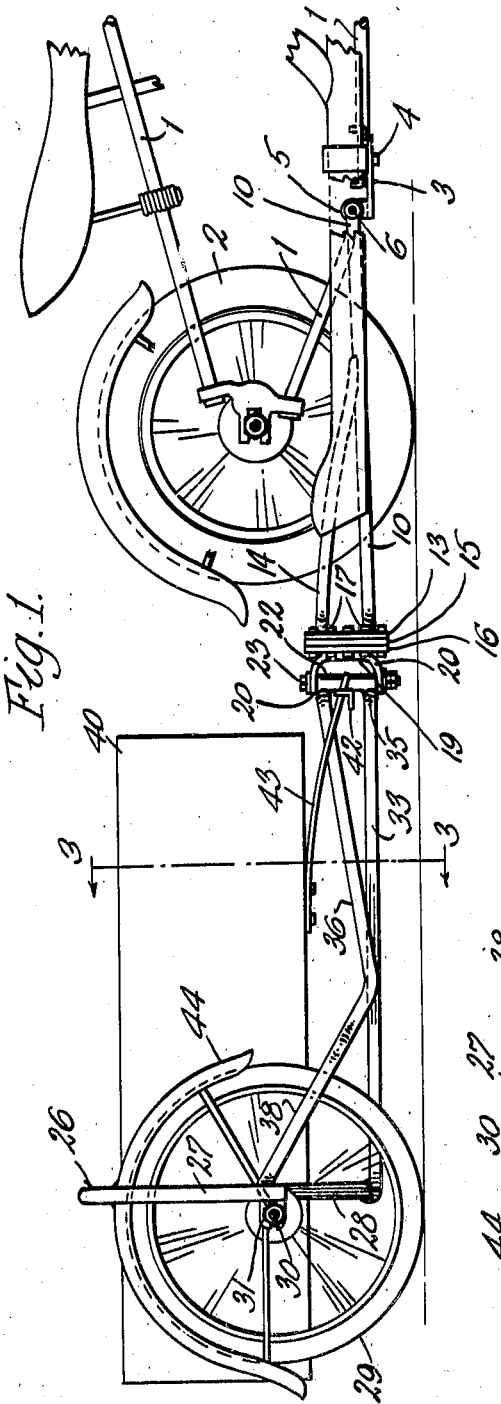
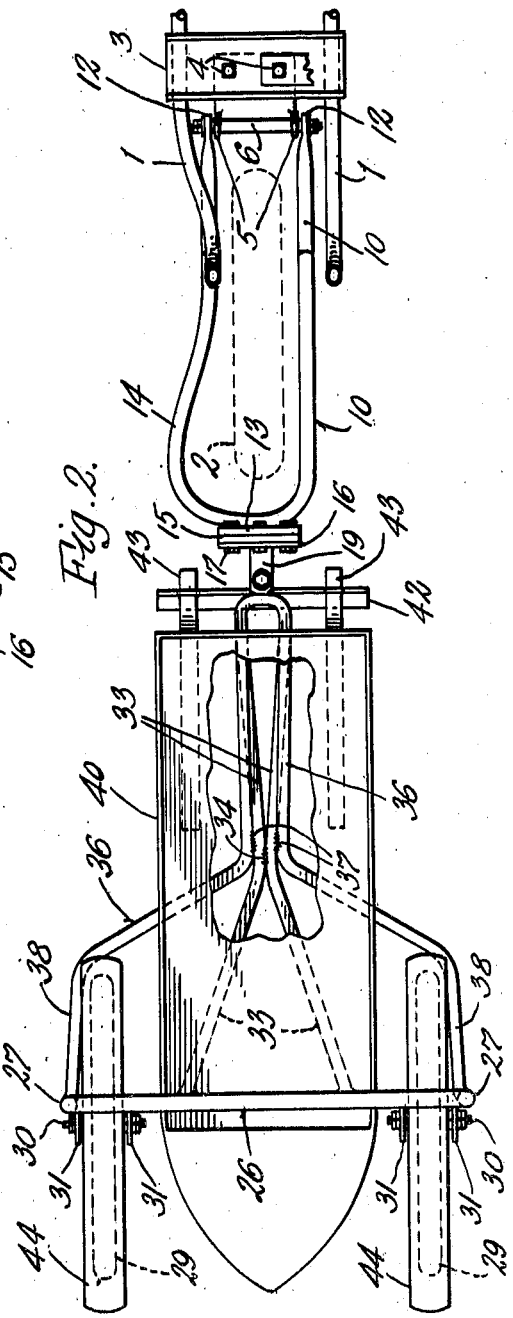
INVENTOR
Frank Neal
by Parker, Rockwood & Farmer.
ATTORNEYS

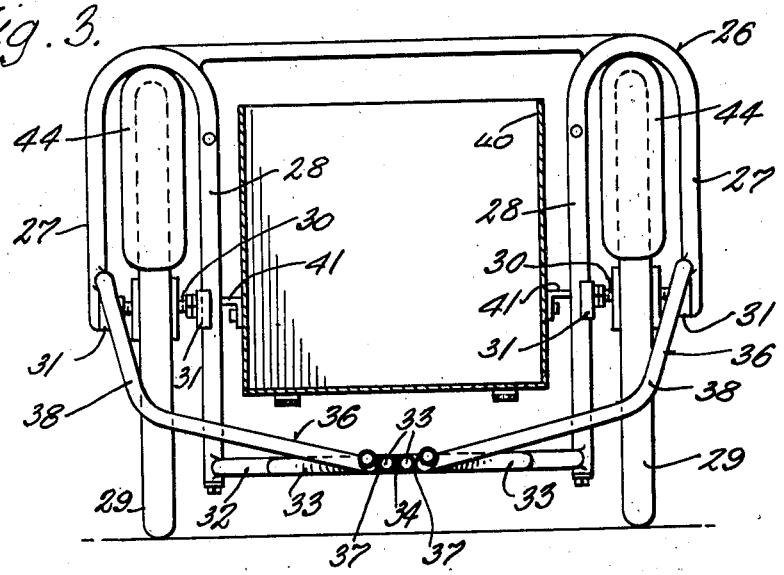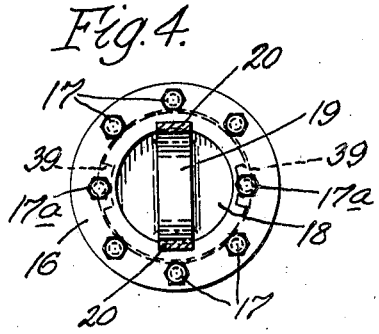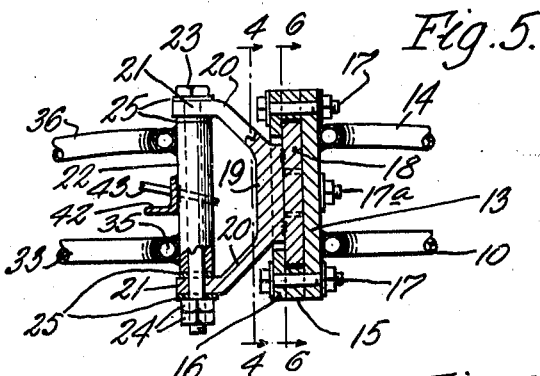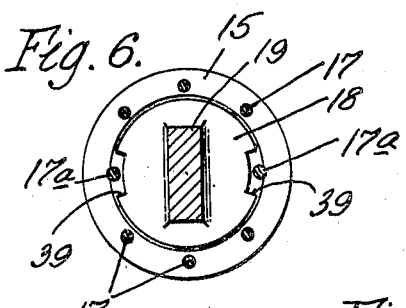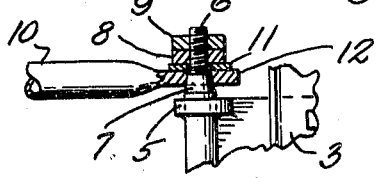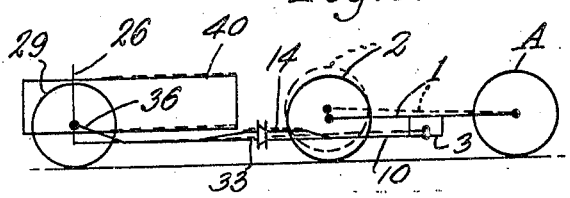

Patented Feb. 29, 1944

2,343,019

UNITED STATES PATENT OFFICE 2,343,019

TRACTOR-TRAILER COMBINATION

Frank Neal, Little Valley, N. Y.

Application September 4, 1942, Serial No. 457,308

14 Claims. (Cl. 280—33.1)

This invention relates to an improved trailer-tractor combination, and more particularly to a two-wheel cycle and trailer therefor. It is in the nature of an improvement upon my prior copending application Serial No. 419,591, filed November 18, 1941, entitled "Trailers."

Heretofore it has been customary to couple all trailers to bicycles or motorcycles through a universal coupling or connection to a rigid rearward extension of the cycle or tractor frame. These trailers are commonly of the two-wheel type, and consequently, if the coupling thereto oscillates vertically, it rocks the trailer body vertically. When the tractor and trailer are moved over a decidedly undulatory roadway, the front and rear wheels of the tractor alternately rise and fall in a sort of see-saw fashion, and all linear vertical rise and fall of the rear wheel is amplified through the rigid rearward extension of the tractor frame and communicated to the trailer frame to cause a rocking of the trailer body about the axis of the wheels. When the tractor and trailer are traveling rapidly, this vertical oscillation of the rear wheel of the tractor is apt to cause a very annoying vertical vibration of the body of the trailer, particularly at its ends, and the present invention relates in part to a construction for minimizing this vibratory movement of the trailer so that the tractor and trailer may travel rapidly over an undulatory roadway without objectionable vibrations of the ends of the trailer body.

An object of this invention is to provide an improved tractor and trailer combination by which a two-wheel trailer may be coupled to a tractor to enable rapid travel of the tractor and trailer over an undulatory highway with a minimum of vertical oscillation of the ends of the trailer body; with which any tendency of the trailer to tip the tractor sideways will be minimized, with which relative lateral tipping or rocking of the trailer and tractor such as may be due to irregular roads and operating conditions, may be permitted to a selected extent; with which the trailer may be coupled closely to the tractor to reduce the drag due to wind resistance; with which the trailer may be more easily towed by the tractor during changes of direction of travel, and which will be relatively simple, durable, light in weight, strong, rigid in construction, and inexpensive.

Another object of the invention is to provide an improved cycle and trailer combination, with which the trailer may be coupled to the cycle in a simple manner, with the trailer closely following the cycle and in line therewith to reduce wind resistance; with which the maneuverability and handling of the cycle will be substantially unaffected; with which the relative tipping of the trailer and cycle within the usual limits may occur; with which the trailer may follow the cycle in changes of direction without objectionable interference with the normal handling of the cycle; and with which the vertical movements of the cycle will cause a minimum of rocking or vertical movements of the trailer body.

Another object of the invention is to provide an improved trailer frame which will be exceptionally light in weight, rigid in construction, which will have high stability, and which is relatively inexpensive.

Another object of the invention is to provide improved means for coupling a trailer to a tractor; with which there will be a minimum of whipping of the trailer when traveling at high speeds; with which any whipping or other movements of the trailer will have a minimum effect upon the tractor, and with which the movements of the tractor, except as to speed and pulling power, will have a minimum of effect upon the trailer.

Various other objects and advantages will be apparent from the following description of an embodiment of the invention, and the novel features will be particularly pointed out hereinafter in connection with the appended claims.

In the accompanying drawings:

Fig. 1 is a side elevation of a part of a motorcycle tractor and a trailer coupled thereto in accordance with this invention;

Fig. 2 is a plan of the same with most of the motorcycle removed to show details of the coupling;

Fig. 3 is a transverse, sectional elevation of the same, with the section taken approximately along the line 3—3 of Fig. 1;

Fig. 4 is a transverse, sectional elevation through the coupling, the section being taken approximately along the line 4—4 of Fig. 5;

Fig. 5 is a longitudinal, sectional elevation through a part of the coupling of the draw bar;

Fig. 6 is a transverse, sectional elevation of the same, the section being taken approximately along the line 6—6 of Fig. 5;

Fig. 7 is a plan, partly in section, of part of the hinge connection between the draw bar and the cycle frame; and Fig. 8 is a schematic diagram illustrating the action of the improved coupling and the advantages accruing from the use of this invention.

In the illustrated embodiment of the invention, the tractor is shown as a motorcycle having a frame 1 connecting the front wheel A (shown only diagrammatically in Fig. 8), and a rear wheel 2. Between the front and rear wheels, the cycle frame depends to a level well below the axis of rotation of the wheels, as shown clearly in Fig. 1, and to the bottom of this frame is secured a plate 3 in any suitable manner, such as by the use of screws or bolts 4. The plate 3 is provided at its rear edge with upstanding ears 5 (see Figs. 1, 2 and 7), which support a hinge pin 6 that projects beyond the ears 5. These projecting ends of the pin 6 have slightly tapered or frusto-conical bearing portions 7, Fig. 7, and beyond such tapered portions, the reduced ends of the pin 6 are threaded to receive nuts 8 and lock nuts 9. A U-shaped coupling member or stirrup 10 straddles the rear wheel of the cycle, with the cross part of the U at the rear of the wheel 2 and with the free ends of the arms that form the U apertured and received over the ends of the hinge pin 6. A washer 11 is disposed between the nut 8 and the flattened end 12 of each arm of the member 10.

By tightening the nuts 8, the ends 12 of the stirrup or coupling member 10 may be moved along the tapered portions 7 until all play is taken up, without unduly restricting the hinge movement of the stirrup or coupling member 10 on the pin 6. By tightening the lock nut 9, unintentional loosening of the nut 8 is prevented. The stirrup or coupling member 10 may be detached from the frame of the cycle by removing the nuts 8 and 9 at each end of the hinge pin 6, and springing the ends 12 of the stirrup or member 10 off of the ends of the pin 6. The cross part of the stirrup or coupling member 10 abuts against and is secured, such as by welding, to one face of a plate 13. A second U-shaped member 14 also abuts against the same face of the plate 13 at a higher vertical position thereon, and its free ends are connected to the side arms of the member 10 intermediate the ends of such arms, as shown clearly in Fig. 1. The plate 13 thus forms a rigid part of the element formed of the parts 10 and 14.

Clamped to the other face of the plate 13 is an annular ring 15, see Fig. 5, and in turn clamped against the exposed face of the ring 15 is another annular ring 16 which has the same outer periphery as the ring 15 and plate 13, but which extends nearer the center of the ring. Bolts 17 pass through the rings 15 and 16 and the plate 13 to clamp them all together and form a housing. Disposed within the center opening of the ring 15 is a plate 18 which has a circular periphery, so that the plate 18 may rotate in the housing but is held against all other movements relatively to the housing. A yoke or member 19 is secured to that portion of the face 18 which is exposed through the center opening of the ring 16, such as by welding, and this member 19 has two spaced arms 20 which terminate in parallel bearing lugs 21, and receive between them a sleeve 22. A bolt 23 passes between and through the lugs 21 and through the bore of the sleeve 22, so as to form a hinge with the bolt 23 as the pivotal axis. Nuts 24 on the bolt 23 prevent its removal, and suitable shims 25 may be disposed against opposite faces of the bearing lugs 21.

The trailer includes a closed loop frame 26 with additional arms 27 depending downwardly from the upper corners of the frame in spaced, but parallel, relation to the vertical sides 28 of the frame. The trailer wheels 29 are received between the side members 28 of the frame and the depending arms 27, and bearing spindles 30 of the wheels are secured in bearing lugs 31 secured to the side members 28 and depending arms 27. Secured to the lower cross arm 32 of the frame 26, at points adjacent the opposite sides of the frame, are brace members 33 which extend toward one another and forwardly until they meet, and at the point where they meet, they are coupled together, such as by welding 34. The members 33 then continue forwardly in slightly diverging relation, and at their forward ends are connected by a cross member 35, which cross member is secured, such as by welding to the sleeve 22. The member 33 may, if desired, be a single rod or member which is doubled back upon itself, with the point of doubling at 35, and with the arms intermediate of their ends being coupled as by welding 34, and then the free ends made divergent and connected to the cross frame member 32.

A second rod 36 is also doubled back upon itself, and at the point of doubling, secured, such as by welding, to the sleeve 22. The arms of this rod 36 are then brought against the sides of the rod 33 adjacent the welding 34 and coupled to the member 33, such as by welding 37. The ends 38 of the rod 36 are then made sharply and rearwardly divergent so as to pass in front of the wheels 29, and then extend rearwardly to the lower ends of the arms 27. These free ends 38 of the member 36 are coupled, such as by welding, to the lower ends of the arm 27, so as to form rigid braces therefor. The members 33 and 36, through their rigid connection to the closed loop frame 26, form a rigid, but forwardly extending tongue or draw bar section which is rigidly connected at its forward end to the sleeve 22, and the latter is hinged on the bolt 23 carried by the arms 20 that extend from the plate 18. The plate 18 is coupled to the housing formed with the plate 13 and rings 15 and 16, and is free to rotate or swivel therein about an axis extending forwardly in the same direction, and forming in effect, a swivel joint between the sleeve 22 and the coupling member 10, which is hinged upon the pin 6 carried by the cycle frame.

It will be noted that the member 10 forms the major part of one section of the draw bar between the cycle frame and the trailer frame, and may, for convenience, be designated as a "tractor section," and the members 33 and 36, which are coupled to the sleeve 22, form therewith what may be termed the trailer section of the draw bar, by which the trailer is towed. The hinge pin 23 is normally vertical when the trailer and cycle are both vertical, and the hinge pin 6 is normally horizontal and transverse to the direction of travel of the cycle. The draw bar is thus hinged to the cycle frame upon the horizontal hinge pin 6, so that relative vertical movements of the trailer, because the draw bar is hingedly connected to the trailer frame, will be about the axis of the hinge pin 6, but as the cycle turns to the left or right, to determine its course, the draw bar articulates about the upright pin 23, so that the trailer may easily follow the tractor with a minimum of lateral drag on the rear end of the cycle or tractor.

The swivel joint formed with the plate 18 allows the trailer to tilt sidewise in either direction and relatively to the cycle frame, without a corresponding tilting of the cycle frame, and vice versa, and this action is desirable in view of the fact that the road irregularities may cause a lateral tilting or rocking of the trailer frame while it is being towed by the tractor. It will also be noted that the swivel joint and the vertical pin 23 are close behind the rear wheel 2 of the cycle or tractor, so that the trailer frame may be brought up close to the rear of the tractor and thus decrease the wind resistance or drag offered by the trailer.

In some instances, it may be desirable to limit the possible lateral tilting or rocking of the trailer frame, due to road irregularities, so that if the trailer is being hauled at a high speed over a road with irregular undulations, any impact against only one of the wheels of the trailer, such as occurs when one wheel only may strike a bump in the road, will not tip the trailer over or tilt it to an unsafe extent. For that purpose, the plate 18 may have in its periphery, one or more notches 39, Fig. 6, such as at opposite sides of the plate, and two of the bolts 17, which may be designated 17a, are set nearer the axis of rotation of the plate 18 within the notches 39. The ends of said notches 39 determine the extent of lateral tilting movement of the trailer relative to the cycle that is allowed, and vice versa.

The trailer body 40 extends through the opening of the loop of the frame 26, and at opposite sides carries pins 41 which extend into the side members 28 of the frame and are there resiliently supported, such as between opposing coil springs confined in the member 28, as disclosed in my copending application hereinbefore identified. The body 40 extends in both directions beyond the frame 26, and at its forward end it is connected in any suitable manner to the members 33 and 36. In the example illustrated, an angle bar 42 is secured, such as by welding, to the sleeve 22, between the members 33 and 36, and leaf spring members 43 extending from the bottom of the body 40 pass freely through apertures in the upstanding flange of the angle bar 42. Thus, as the forward end of the body 40 descends, the leaf springs 43 will flex and slide to some extent in the apertures in the bar 42, because the pins 41 on the body 40, through their engagement in the slots of the frame members 28, prevent forward and rearward movement of the body 40 relatively to the trailer frame. Obviously any other mounting between the forward end of the body 40 and trailer frame or forward extension thereof may be provided.

Referring now to the diagram shown in Fig. 8, the front wheel of the cycle is designated by the reference A, and the rear wheel by the reference 2, and the frame by the reference 1. If, for example, the rear wheel 2 moves upwardly without a simultaneous and equal movement of the front wheel A, the wheel 2 will, for example, move from the full to the dash line position in Fig. 8, and the frame 1 will move from the full to the dash line position. If, as heretofore, the frame 1 was extended rearwardly and there coupled to the front end of the trailer, such rearward extension being further from the axis of the oscillation (which would be the axis of the front wheel A), the actual linear, vertical movement of the coupling point on the rear end of the frame 1 would be much greater than the actual vertical movement of the wheel 2. That vertical movement of the coupling point would rock the forward end of the trailer body to this amplified extent, and hence such vertical movements of the wheel 2 would cause greatly amplified oscillations of the trailer body. Since the trailer body in this type of the invention extends well forwardly of the trailer wheels, the forward end of the trailer body would be given this amplified vertical movement, thus causing a very undesirable oscillatory movement of the trailer body. This undesired oscillation became quite pronounced and objectionable when the trailer is towed over a very uneven road at high speed. It will be noted from the diagram in Fig. 8, that the portion of the frame 1 between the front and rear wheels of the motorcycle, being nearer the axis of oscillation of the cycle frame, which would be the axis of the wheel A has a lesser vertical movement than even the rear wheel 2, and thus, if the connection to the trailer is made to the frame 1 between the front and rear wheels of the tractor, the amplitude or extent of vertical oscillation of the front end of the trailer body will really be less than that of the rear motorcycle wheel. If the front wheel A of the motorcycle moves vertically, the oscillation of the motorcycle frame will be about the axis of the rear wheel 2, and since the connection to the trailer in accordance with this invention, is between these two, the oscillation imparted to the trailer frame and body will also be a minimum. Thus a point approximately midway between the front and rear wheels of the cycle or tractor will have a minimum of vertical movement, or in other words, a smoother travel and, consequently, a minimum of vertical movements will be imparted to the trailer body and frame. Inasmuch as the draw bar formed of the coupling member 10, the forwardly extending members 33 and 36 of the trailer frame, the sleeve 22, and the coupling means between the sleeve 22 and member 10 permits of no hinging about a horizontal axis transverse to the direction of pull except at the hinge 6, and the connection to the hinge 6 is far forwardly of the trailer wheels, the actual linear vertical movements of the forward end of the trailer body 40 will be a minimum because that forward end is nearer the axis of oscillation of the trailer body than the hinge pin 6. At the same time, the vertical pin 23 enables an easy towing of the trailer around corners or in making sharp turns, without causing objectionable sidewise drag on the rear end of the motorcycle or tractor. The motorcycle may tilt sidewise sufficiently to enable one to make turns, or to start the motorcycle and to keep it balanced, without causing a corresponding tilting of the trailer, and the tilting of the trailer due to irregularities encountered by the rear wheels 29 will be permitted by the swivel joint without causing a similar tilting of the motorcycle.

It will be understood that the trailer may have mud guards 44 over the wheels 29, carried by the frame 26, if desired.

It will be understood that various changes in the details and arrangements of parts, which have been herein described and illustrated in order to explain the nature of the invention, may be made by those skilled in the art within the principle and scope of the invention as expressed in the appended claims.

I claim as my invention:

1. In combination, a tractor with front and rear wheels, a frame connecting said wheels and having a portion depending between them, a trailer having a frame, two wheels, one at each side of and supporting said frame, a draw bar connecting said tractor and trailer and which comprises a tractor section and a trailer section disposed end to end with said trailer section extending forwardly from said trailer frame, a substantially vertical pivot connecting the front end of said trailer section to the rear end of said tractor section back of said tractor rear wheel, a horizontal pivot connecting the front end of said tractor section to said depending portion of said tractor frame well forward of said tractor rear wheel and well below the axis of rotation thereof, a swivel joint in one of said sections by which the portions of said draw bar fore and aft of said joint may have relative movement about an axis lengthwise of the draw bar, and means for limiting movement of said swivel joint to that which is safe in operation.

2. In combination, a tractor with front and rear wheels, a frame connecting said wheels, a trailer, a draw bar rigidly connected to said trailer, extending therefrom forwardly, and comprising a tractor section and a trailer section, said sections extending end to end with one another, a horizontal pivot connecting said tractor frame with the front end of said tractor section of said draw bar, a yoke-shaped member, with a substantially vertical pivot connecting the front end of said trailer section of said draw bar to the rear end of said tractor section for rocking about the vertical pivot and enabling said trailer to follow said tractor in horizontal turning movements, and a swivel joint in said trailer section by which portions of that section fore and aft of the swivel joint may swivel about a substantially horizontal axis extending in a direction approximately lengthwise of said draw bar to accommodate relative tilting movements between said tractor and trailer, said swivel joint having means to limit relative movement therein to an extent that will accommodate normal and safe relative tilting of the tractor and travel in passing over an irregular highway but will prevent unsafe relative tilting movements.

3. In an improved tractor and trailer combination, that improvement in the coupling between the tractor and trailer which comprises a draw bar having a trailer section which extends forwardly from said trailer and a tractor section which extends rearwardly from said tractor and is disposed in end to end relation to said trailer section, a generally horizontal pivot for connecting the forward end of said tractor section to said tractor, a yoke member having a pair of vertically spaced arms, a substantially vertical sleeve member, one of said members being connected to one of said sections and the other to the other of said sections at their adjacent ends, a pivot pin passing through the free ends of said yoke arms and through said sleeve and providing a vertical pivot connecting said draw bar connections whereby said trailer may swing and follow said tractor in horizontal turning movements, the connection of said yoke member to its said section including a substantially circular plate attached to said yoke member and having its faces approximately normal to the longitudinal axis of the draw bar, and a housing fixed to the rear end of said tractor draw bar section which has a guide recess complementary to and in which said plate may rotate about a substantially horizontal axis extending lengthwise of said draw bar, thereby providing a swivel connection between said sections of said draw bar to accommodate relative lateral tilting movements between said tractor and trailer.

4. In an improved tractor and trailer combination, that improvement in the coupling between the tractor and trailer which comprises a draw bar having a trailer section which extends forwardly from said trailer and a tractor section which extends rearwardly from said tractor and is disposed in end to end relation to said trailer section, a generally horizontal pivot for connecting the forward end of said tractor section to said tractor, a yoke member having a pair of vertically spaced arms, a substantially vertical sleeve member, one of said members being connected to one of said sections and the other to the other of said sections at their adjacent ends, a pivot pin passing through the free ends of said yoke arms and through said sleeve and providing a vertical pivot connecting said draw bar connections whereby said trailer may swing and follow said tractor in horizontal turning movements, a swivel comprising two parts, one of which is fixed to the other ends of said yoke arms and the other of which is fixed to the rear end of said tractor draw bar section, one of said swivel parts comprising a substantially circular plate, and the other swivel part comprising a housing having a guide recess complementary to and in which said plate is rotatably received to turn only about a substantially horizontal axis extending lengthwise of said draw bar, to accommodate relative lateral tilting movements between said tractor and trailer.

5. In an improved tractor and trailer combination, that improvement in the coupling between the tractor and trailer which comprises a draw bar having a trailer section which extends forwardly from said trailer and a tractor section which extends rearwardly from said tractor and is disposed in end to end relation to said trailer section, a generally horizontal pivot for connecting the forward end of said tractor section to said tractor, one of said sections having, at its end adjacent the other section, a substantially circular plate, and the other of said sections having secured to its end adjacent said plate a housing which has a guide recess in which said plate is rotatably confined to afford relative turning movements between said plate and said housing about a substantially horizontal axis extending lengthwise of said draw bar, said plate and housing forming a two-part swivel, to accommodate relative lateral tilting movements between said tractor and trailer.

6. In an improved tractor and trailer combination, that improvement in the coupling between the tractor and trailer which comprises a draw bar having a trailer section which extends forwardly from said trailer and a tractor section which extends rearwardly from said tractor and is disposed in end to end relation to said trailer section, a generally horizontal pivot for connecting the forward end of said tractor section to said tractor, one of said sections having, at its end adjacent the other section, a substantially circular plate, and the other of said sections having secured to its end adjacent said plate a housing which has a guide recess in which said plate is rotatably confined to afford relative turning movements between said plate and said housing about a substantially horizontal axis extending lengthwise of said draw bar, said plate and housing forming a two-part swivel, and stop means limiting the relative rotation between said plate and said housing, whereby relative lateral tilting movements between said tractor and trailer may be permitted within predetermined limits.

7. In an improved tractor and trailer combination, that improvement in the coupling between the tractor and trailer which comprises a draw bar having a trailer section which extends forwardly from said trailer and a tractor section which extends rearwardly from said tractor and is disposed in end to end relation to said trailer section, a generally horizontal pivot for connecting the forward end of said tractor section to said tractor, a joint with a vertical pivotal axis between said sections, a swivel joint in said trailer section comprising a substantially circular part mounted on one part of said trailer section, and a housing part mounted on the other part of said trailer section and having a recess substantially complementary to said circular part in which the latter is rotatably confined to enable relative turning movements between said parts about a substantially horizontal axis extending lengthwise of said draw bar, said parts having cooperating pin and slot portions that allow substantial and safe relative tilting of said tractor and trailer as the tractor and trailer travel over uneven highways.

8. In an improved tractor and trailer combination, that improvement in the coupling between the tractor and trailer which comprises a draw bar having a trailer section which extends forwardly from said trailer and a tractor section which extends rearwardly from said tractor and is disposed in end to end relation to said trailer section, a generally horizontal pivot for connecting the forward end of said tractor section to said tractor, a joint with a vertical pivotal axis between said sections, a swivel joint in said trailer section with portions connected for rotation about an axis extending in a direction lengthwise of that section, and one of said swivel joint parts having a stop and the other of said parts having an abutment engageable with said stop to limit the rotation between said parts to an extent which accommodates safe relative tilting of the tractor and trailer to a substantial amount as they travel over an irregular surface of a highway, but prevents such relative tilting beyond that extent, whereby lateral tilting movements between said tractor and trailer may be permitted within predetermined limits.

9. In an improved tractor and trailer combination, that improvement in the coupling between the tractor and trailer which comprises a draw bar having a trailer section which extends forwardly from said trailer and a tractor section which extends rearwardly from said tractor and is disposed in end to end relation to said trailer section, a generally horizontal pivot for connecting the forward end of said tractor section to said tractor, a swivel joint in the trailer section and including parts connected for rotation about an axis extending in a direction lengthwise of the draw bar, one of said swivel joint parts having a stop and the other of said parts having abutments spaced from said stop but engageable with said stop to limit the rotation between said parts, to an extent that allows safe relative tilting of the tractor and trailer as they pass over an uneven highway but prevent such relative tilting beyond that extent.

10. An improved tractor-trailer combination, comprising a tractor having front and rear wheels and a frame connecting said wheels, a trailer having a frame supported at opposite sides by two wheels, means coupling said trailer frame to said tractor frame and hinged to said tractor frame between said front and rear wheels for rocking movement about an approximately horizontal axis transverse to the longitudinal axis of the tractor frame, said coupling means being articulated at a point approximately in the rear of the rear tractor wheel by a hinge with an approximately vertical axis of rocking, and also having therein and spaced in a direction rearwardly with respect to said hinge with a vertical axis, a swivel joint by which pull is transmitted between tractor and trailer and which rocks about an approximately horizontal axis that extends in the direction of pull between the tractor and trailer, whereby the trailer may easily follow the tractor in changes of direction of travel by movement at said hinge with the vertical axis, may rock sidewise in either direction relatively to said tractor through relative movement in said swivel joint, and will be rocked about the axis of rotation of the trailer wheels to a minimum extent through the hinge connection to the tractor frame as the tractor wheels alternately rise and fall during their travel over an undulatory roadway, said swivel joint having means to limit said sidewise rocking to a substantial rotation and prevents such rocking beyond that extent.

11. An improved tractor-trailer combination, comprising a tractor having front and rear wheels and a frame connecting said wheels, a trailer having a frame supported at opposite sides by two wheels, means coupling said trailer frame to said tractor frame and hinged to said tractor frame between said front and rear wheels for rocking movement about an approximately horizontal axis transverse to the longitudinal axis of the tractor frame, said coupling means being articulated at a point approximately in the rear of the rear tractor wheel by a hinge with an approximately vertical axis of rocking, and also having therein and spaced in a direction rearwardly with respect to said hinge with a vertical axis, a swivel joint by which pull is transmitted between tractor and trailer and which rocks about an approximately horizontal axis that extends in the direction of pull between the tractor and trailer, whereby the trailer may easily follow the tractor in changes of direction of travel by movement at said hinge with the vertical axis, may rock sidewise in either direction relatively to said tractor through relative movement in said swivel joint, and will be rocked about the axis of rotation of the trailer wheels to a minimum extent through the hinge connection to the tractor frame as the tractor wheels alternately rise and fall during their travel over an undulatory roadway, said swivel joint having cooperating parts thereof limiting the extent of swivel action to a substantial extent which will prevent unsafe sidewise tilting of said trailer relatively to said tractor.

12. In a tractor-trailer combination, that improvement in the trailer which comprises a closed-loop frame with an opening disposed in an upright position, a body extending through said opening in a direction normal to a face thereof, a wheel disposed at each side of the frame, said frame having a downwardly opening slot at each side in which one of said wheels is received, means rotatably supporting each wheel from said frame at opposite sides of the slot in which it is received, a rod doubled back upon itself and at its free ends rigidly coupled to the lower part of said frame beneath said body, at points between said wheels and spaced apart, said rod having its arms brought together in a converging manner beneath said body and coupled to each other intermediate of their ends, a brace connected to the frame at the outer side of each slot, extending forwardly and towards said arms beneath said body and coupled to said arms, and coupling means carried by said rod at the forward end formed by the doubling by which it may be hingedly coupled to said tractor.

13. In a tractor-trailer combination, that improvement which comprises a two-wheel trailer having a frame and wheels aligned at opposite sides thereof and also having a draw bar fixed to and extending from the frame by which it may be coupled to a tractor, said draw bar having its free end formed to make with a tractor frame a hinge connection having a hinge pin approximately horizontal and crosswise of the length of the bar, said bar having two joints spaced apart intermediate of its length, the forward one of which is a hinge joint with its swinging axis upright, and the other of which is a swivel joint with its swivel axis extending in the direction of pull, said swivel joint having cooperating abutments on the relatively moving parts thereof spaced apart sufficiently to allow substantial relative rocking of said parts and engaging to limit such rocking beyond a safe extent which will prevent danger of upsetting of the trailer as it travels over an uneven roadway.

14. In a tractor-trailer combination, that improvement which comprises a trailer frame with an upright portion, a pair of wheels at opposite sides of the frame, and a rigid, forwardly progressing extension attached to the lower part of the upright portion, a body supported at one end by said upright portion and extending forwardly above said extension, said extension terminating at its forward end in an upright sleeve, a bar secured to said sleeve and extending horizontally and crosswise of the length of said extension, resilient means supporting said body from said bar, and means hingedly connected to said sleeve extending forwardly therefrom and formed for connection to a tractor.

FRANK NEAL.